United States Patent

Kulkarni

[19]

[11] Patent Number: 5,950,227
[45] Date of Patent: Sep. 7, 1999

[54] CPU WRITE-BACK CACHE COHERENCY MECHANISM THAT TRANSFERS DATA FROM A CACHE MEMORY TO A MAIN MEMORY AFTER ACCESS OF THE MAIN MEMORY BY AN ALTERNATIVE BUS MASTER

[75] Inventor: Upendra M. Kulkarni, Sacramento, Calif.

[73] Assignee: Intel Corporation, Santa Clara, Calif.

[21] Appl. No.: 08/826,433

[22] Filed: Mar. 20, 1997

Related U.S. Application Data

[63] Continuation of application No. 08/088,205, Jul. 6, 1993, abandoned.

[51] Int. Cl.⁶ ..................................................... G06F 12/12
[52] U.S. Cl. ............................................ 711/143; 711/135
[58] Field of Search ................................. 711/135, 141, 711/143, 146

[56] References Cited

U.S. PATENT DOCUMENTS 5,119,485  6/1992  Ledbetter, Jr. et al. ................. 711/146

*Primary Examiner*—Eddie P. Chan
*Assistant Examiner*—Kevin L. Ellis
*Attorney, Agent, or Firm*—Blakely, Sokoloff, Taylor & Zafman

[57] ABSTRACT

A writeback cache coherency control module that can allow systems that do not support cache, or support only writethrough cache, to operate with a processor that has writeback cache. The control module also maintains coherency between main memory and cache in a writeback subsystem.

22 Claims, 8 Drawing Sheets

| I/O Address | Description |
|---|---|
| 0000h | DMA channel 0, memory address register |
| 0001h | DMA channel 0, transfer count register |
| 0002h | DMA channel 1, memory address register |
| 0003h | DMA channel 1, transfer address register |
| 0004h | DMA channel 2, memory count register |
| 0005h | DMA channel 2, transfer count register |
| 0006h | DMA channel 3, memory address register |
| 0007h | DMA channel 3, transfer count register |
| 0008h | DMA channel 0-3, status register |
| 000Bh | DMA channel 0-3, mode register |
| 000Ch | DMA Clear Byte Pointer |
| 000Dh | DMA Master Clear Byte |
| 0081h | DMA channel 2, page table address register |
| 0082h | DMA channel 3, page table address register |
| 0083h | DMA channel 1, page table address register |
| 0087h | DMA channel 0, page table address register |
| 0089h | DMA channel 6, page table address register |
| 008Ah | DMA channel 7, page table address register |
| 008Bh | DMA channel 5, page table address register |
| 008Fh | DMA channel 4, cascade to channels 5-7 |
| 00C0h | DMA channel 4, memory address register |
| 00C2h | DMA channel 4, transfer count register |
| 00C4h | DMA channel 5, memory address register |
| 00C6h | DMA channel 5, transfer count register |
| 00C8h | DMA channel 6, memory address register |
| 00CAh | DMA channel 6, transfer count register |
| 00CCh | DMA channel 7, memory address transfer |
| 00CEh | DMA channel 7, transfer count register |
| 00D0h | DMA channel 5-7 status register |
| 00D2h | DMA write request register |
| 00D6h | DMA channel 5-7 mode register |
| 00D8h | DMA Clear Byte Pointer |
| 00DAh | DMA Master Clear Byte |

FIG. 3

| | |
|---|---|
| Standard I/O Addresses | 0000h-00FFh (except 0008h and 00D0h) |
| | 0278h-027Bh |
| | 02F8h-02FFh |
| | 0378h-037Bh |
| | 03B4h-03B5h |
| | 03Bah, 03BCh-03CCAb, 03CCh |
| | 03CEh-03CFh |
| | 03D4h-03D5h, 03DAh |
| | 03F8h-03FFh |
| Non-Standard I/O Addresses | 0008h, 00D0h, 0200h-0277h |
| | 027Ch-02F7h |
| | 0300h-0377h |
| | 037Ch-03B3h |
| | 03B6h-03B9h |
| | 03BBh, 03CBh, 03CDh |
| | 03D0h-03D3h |
| | 03D6h-03D9h |
| | 03DBh-03F7h |
| | 0400h-FFFFh |
| Standard Memory Addresses | 00000000h-Maximum base memory address |
| | A0001h-BFFFFh |
| | E00001h-FFFFFh |
| | 00100000h-Maximum extended memory addresses |
| Non-Standard Memory Addresses | (Maximum base memory address +1) - A0000hf |
| | C0000h-E0000h |
| | (Maximum extended memory address +1) - FFFFFFFFh |
| Standard Interrupts: | IRQ0-IRQ2, IRQ8 and IRQ13 |
| Non Standard Interrupts: | IRQ3-IRQ7, IRQ9-IEQ12, IRQ14-IRQ15 |

FIG. 4

| ADDRESS OF BATTERY BACK-UP MEMORY | INFORMATION STORED |
|---|---|
| 15 | Conventional memory low byte |
| 16 | Conventional memory high byte |
| 17 | Extended memory low byte |
| 18 | Extended memory high byte |
| 30 | Alternate Extended memory low byte (ISA only) |
| 31 | Alternate Extended memory high byte (ISA only) |
| 35 | Alternate Extended memory low byte (MCA only) |
| 36 | Alternate Extended memory high byte (MCA only) |

CPU WRITE-BACK CACHE COHERENCY MECHANISM THAT TRANSFERS DATA FROM A CACHE MEMORY TO A MAIN MEMORY AFTER ACCESS OF THE MAIN MEMORY BY AN ALTERNATIVE BUS MASTER

This is a Continuation of application Ser. No. 08/088,205, filed Jun. 6, 1993 now abandoned.

CROSS-REFERENCE TO RELATED APPLICATIONS

The following co-pending U.S. patent applications related to the present application. Each of the listed co-pending applications are assigned to the same assignee as the present application.

1) U.S. patent application Ser. No. 08/088,205, filed Jul. 6, 1993, entitled "A CPU WRITE-BACK CACHE COHERENCY MECHANISM THAT TRANSFERS DATA FROM A CACHE MEMORY TO A MAIN MEMORY BEFORE ACCESS OF THE MAIN MEMORY BY AN ALTERNATIVE BUS MASTER"

2) U.S. patent application Ser. No. 08/228,145, filed Apr. 15, 1994, entitled "CACHE COHERENCY MECHANISM FOR WRITE BACK CACHES ON NON-WRITE BACK BUSSES", now U.S. Pat. No. 5,555,398.

3) U.S. patent application Ser. No. 08/130,025, filed Sep. 30, 1993, entitled "LOW COST WRITE THROUGH CACHE COHERENCY APPARATUS AND METHOD FOR COMPUTER SYSTEMS WITHOUT A CACHE SUPPORTING BUS", now U.S. Pat. No. 5,555,006.

4) U.S. patent application Ser. No. 07/998,938, filed Dec. 30, 1992, entitled "CACHE COHERENCY MAINTENANCE ON NON-CACHE SUPPORTING BUSES", now U.S. Pat. No. 5,678,025.

BACKGROUND OF THE INVENTION

1. Field of the Invention

The present invention relates to a computer architecture which contains a coherency control module that allows a writeback cache to be implemented into existing architectures and which maintains coherency between the writeback cache and the main memory.

2. Description of Related Art

Microprocessor performance can be greatly enhanced by use of an on-chip cache memory. The cache provides a local high speed memory store for storage of data and instructions used by a central processing unit (CPU) or microprocessor during normal execution of a sequence of instructions. In a conventional computer system, a main memory is also coupled to the CPU via a bus for main storage of program instructions and data. Access to the main memory by the CPU is typically much slower than access to the cache.

An important function of a cache subsystem is the maintenance of cache coherency. The contents of cache memory must be consistent with the corresponding locations in main memory. Cache coherency may be affected if devices other than the CPU attempt to write into main memory. Many methods exist for maintaining cache coherency in conventional computer systems. Once such method is embodied in the cache subsystem of the i486 brand microprocessor manufactured by Intel Corporation. i486 is a registered trademark of Intel Corporation. When writing data, the i486 writes data to both the cache and the main memory to maintain coherency between the two memory devices. Such a system is typically referred to as writethrough cache.

The bus in a typical computer system architecture is used to couple the CPU and other devices such as a direct memory access (DMA) controller and other bus master cards to main memory through a memory controller. In systems that include cache, signals are typically provided on the bus for supporting the cache subsystem and specifically for supporting the cache coherency logic. These signals are used by the CPU and the memory controller to determine for a CPU memory access request whether the requested data may be found in the cache or whether an access to main memory must be initiated. An access to main memory must be initiated if the requested location in main memory is updated by a device other than the CPU, because the corresponding location in the cache memory is no longer valid. The bus used in systems supporting an i486 microprocessor provide these cache control signals on the bus. It will be apparent to those skilled in the art that systems supporting a different brand of microprocessor also provide cache control signals on the bus.

Although buses, processors and memory controllers fully supporting cache subsystems are well-known in the art, other computer systems not supporting cache memory are also well known. One well-known microprocessor used in conventional non-cache supporting computer systems is the 386 brand microprocessor manufactured by Intel Corporation. 386 is a registered trademark of Intel Corporation. It will be apparent to those of ordinary skill in the art that other processors not supporting a cache subsystem exist in the prior art. Because these processors do not support a cache subsystem, the bus coupling these processors and other devices to main memory through a memory controller do not support cache control signals. In non-cache supporting systems, each memory access request made by the CPU or other memory access devices cause the memory controller to initiate an access to main memory. These systems therefore typically operate much more slowly than cache supporting computer systems. Thus, conventional computer systems either fully support a cache subsystem wherein both the processor and the bus support caching, or other conventional systems do not support caching wherein neither the processor nor the bus support caching.

In some situations, it is advantageous to implement a hybrid computer system wherein a processor with an integrated cache is used with a non-cache supporting bus. A non-cache supporting bus is one in which the signals required to support a cache are missing. Such a hybrid system could be built, for example, if a 386 brand microprocessor is upgraded to an i486 brand microprocessor thereby gaining the benefit of a faster processor and one capable of executing i486 compatible software. It will be apparent to those skilled in the art that other situations may arise whereby a processor with an integrated cache may advantageously be used with a non-cache supporting bus. In spite of the advantages of a hybrid system configuration, conventional techniques can not support this hybrid configuration. In order to use the cache subsystem on a processor with an integrated cache, cache control signals must be present on the bus to maintain cache coherency. This is because a memory access device, such as a DMA controller or other processor may initiate a memory access that modifies main memory and thereby renders the data in cache obsolete.

It is also desirable to improve the performance of existing computer system that Support a writethrough cache subsystem. Although a writethrough cache improves the efficiency of the processor, the system is still slowed down by the extra cycles required to store the data in both the cache and the main memory. There exist another type of cache subsystem commonly referred to as a writeback cache which improves the speed of the processor. During the write routine of a writeback cache subsystem, the data is stored in the cache if the address of the data corresponds to an address in the cache memory. The cache marks the modified data which is typically referred to as a "dirty" cache line. The cache does not store the dirty data in the main memory until the processor writes new data in the same address, or the processor flushes the whole cache. A lack of coherency will occur if an external device reads the contents of the main memory before the cache writesback the dirty data. 386 and i486 based systems are presently not equipped to fully support a processor with writeback cache.

It would be desirable to upgrade existing 386 or i486 based computer systems to incorporate a processor with writeback cache and to maintain coherency between the writeback cache and the main memory.

SUMMARY OF THE INVENTION

The present invention is a writeback cache coherency control module that allows systems that do not support cache, or support only writethrough cache, to operate with a processor that has writeback cache. The control module also maintains coherency between main memory and cache in a writeback subsystem.

The module contains a monitoring circuit that intercepts addresses and control signals generated by the CPU. After detection of the addresses and control signals the module determines whether the CPU is providing a command that enables a memory access device to access the main memory and whether the command is for a read or write of memory. If the command enables the memory access device to read the main memory, the module writesback the data of the cache into the main memory before releasing the CPU command to the memory access device.

If the CPU command enables the memory access device to modify the data of the main memory, upon completion of the modification of the main memory the module will initiate a writeback of data from cache to main memory. The module then disables and flushes all or part of the cache memory so that the cache does not contain data that is inconsistent with the modified contents of the main memory. For systems that can support writethrough cache, only the cache lines associated with the addresses that are being modified in the main memory are invalidated.

Therefore it is an object of the present invention to provide a module that will convert systems that do not support cache, or support only writethrough cache, to operate with a writeback cache subsystem.

It is also an object of the present invention to provide a module that maintains coherency between a writeback cache subsystem and the main memory in a system that does not conventionally support a writeback cache.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 3 illustrates the external device address table of the preferred embodiment;

FIG. 4 illustrates the cacheability map of the preferred embodiment;

DETAILED DESCRIPTION OF THE INVENTION

Figure 1:
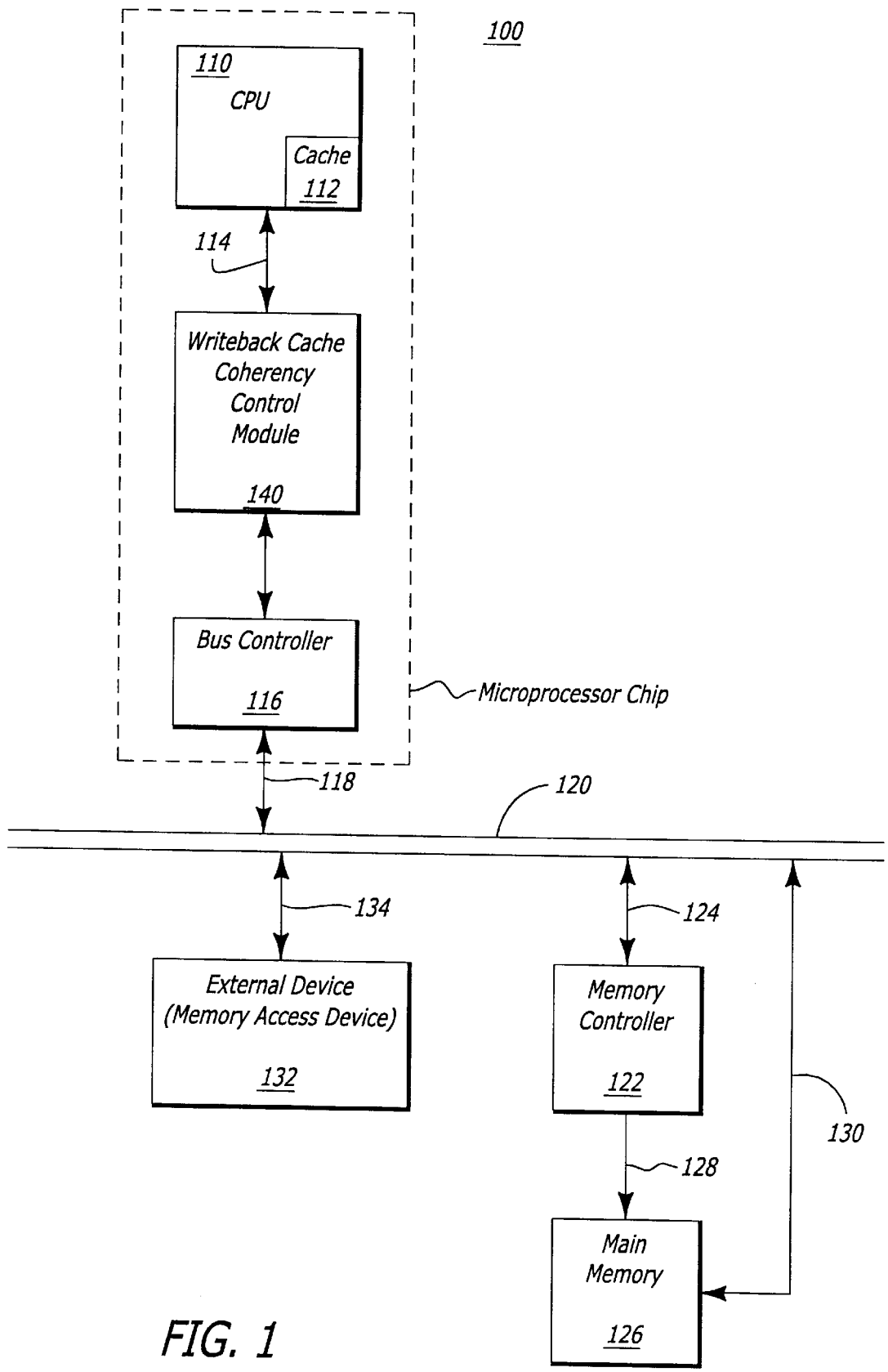
FIG. 1 is a block diagram of the architecture of the computer system in which the present invention operates.

Referring to the drawings more particularly by reference numbers, FIG. 1 is a block diagram of the computer system architecture 100 of the present invention. FIG. 1 illustrates a computer system comprising a bus 120 which includes address, data and control information as conventionally implemented and well-known in the art. In the preferred embodiment, bus 120 is a memory bus used with either the 386 or i486 brand microprocessor manufactured by the assignee of the present invention. That is, bus 120 either supports a writethrough cache subsystem (i486 architecture) or does not support cache (386 architecture). A bus controller 116 is tied to the bus 120 via an interface line 118. The bus controller 116 manages the transfer of information between the bus 120 and a central processing unit (CPU) 110, to which bus controller 116 is coupled via interface line 114. Bus controller 116 is well-known in the art. CPU 110 is a microprocessor core having an on-board cache memory 112. In the preferred embodiment, a Pentium™ brand microprocessor manufactured by the assignee of the present invention is used. Each line of the Pentium™ on-board cache has a pin setting which will determine whether the line is writethrough cacheable or writeback cacheable. It will be apparent to those of ordinary skill in the art, however, that other processors using cache memory may be implemented with the present invention.

A main memory 126 is also coupled to the bus 120 through memory controller 122. Memory access requests are received by memory controller 122 via interface line 124 from bus 120. The addressing and control portion of a memory access request is sent to main memory 126 via interface line 128. The data associated with a memory access request is transferred directly between bus 120 and memory 126 via interface line 130. This configuration of a memory controller and a main memory tied to a bus is well-known to those of ordinary skill in the art.

FIG. 1 also shows an external device 132 coupled to the bus 120 by interface line 134. The external device 132 represents any device that may be tied to the bus for the purpose of accessing memory 126 through bus controller 122 (i.e. a memory access device). Such devices include direct memory access (DMA) controllers and other processors or controllers (bus master devices) sharing memory with CPU 110. These external devices are capable of directly accessing and modifying main memory 126.

In the system architecture illustrated in FIG. 1, the CPU 1 accesses memory 126 through the bus 120. A snapshot of main memory 126 is maintained within cache memory 112. During the normal processing of a series of instructions, the CPU 110 generates memory access requests. These memory access requests comprise an address of a location in main memory 126 along with control signals defining whether the memory access is a read or write access, and a memory or I/O access. The generation and processing of these types of memory access requests is well-known in the art. Some of the memory access requests generated by CPU 110 may reference locations currently residing within cache memory 112. In this case, a cache hit condition occurs and the memory access requests may be handled more quickly, because the system does not have to generate additional cycles to access the main memory 126 through the bus 120. For CPU's that have only writethrough cache capabilities, any data written into cache is also written into the main memory. For CPU's that have writeback cache, the data is written into cache without a further writethrough to main memory. In the writeback mode, the CPU 110 will also set a control bit which signifies that the cache 112 contains data that is not in main memory 126 ("dirty data"). The advantages of the use of cache memory 112 is only realized if the contents of the cache 112 corresponds to the contents of main memory 126. Maintaining this correspondence between cache memory 112 and main memory 126 is called maintaining cache coherency.

Complications are introduced when a memory access device such as external device 132 is tied to bus 120 and allowed to independently modify the contents of main memory 126. In this case, the CPU 110 can no longer maintain cache coherency. For example, a memory access request generated by CPU 110 to a particular location would cause the contents of the corresponding location to be fetched from main memory and stored within cache memory 112. Some time later, an external device 132 may generate a memory access request to modify the corresponding location in main memory 126. In a 386 architecture the bus controller 116 does not provide the CPU with the addresses of the main memory 126 being modified by the external device 132. In an i486 architecture the bus controller 116 provides the CPU 110 with the addresses being modified within the main memory 126 and compares the addresses with the contents of the cache 112. If the addresses accessed by the external device 132 are found in cache 112, the CPU 110 invalidates the lines in the cache 112 associated with the accessed addresses.

In the present invention, a writeback cache coherency control module 140 is added to the Computer system architecture as illustrated in FIG. 1. Using the circuitry and methods described below, the control module 140 intercepts any communication between the CPU 110 and the external device 132. The module 140 provides a number of different functions depending upon the interpretation of the addresses and control signals received from the CPU 110. For example, the module 140 can control the cache 112 so that the system operates in a writeback cache mode. The module 140 also maintains coherency between the writeback cache 112 and the main memory 126.

Figure 2:
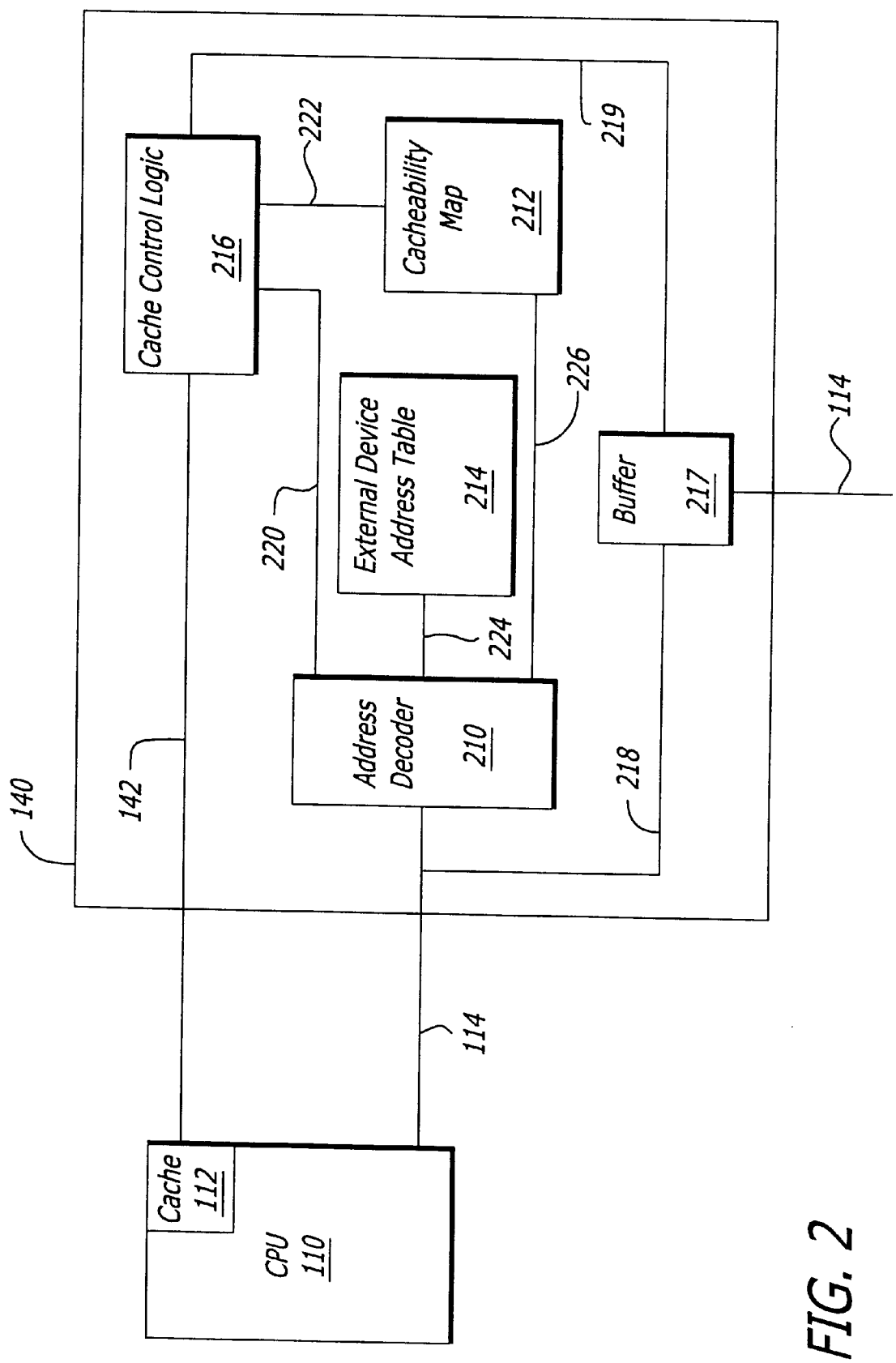
FIG. 2 is a block diagram of the coherency maintenance module of the present invention.

Referring now to FIG. 2, the internal architecture of the control module 140 is illustrated. The module 140 contains an address decoder 210 coupled to the CPU 110 through the bus 114. Address decoder 210 receives and interprets address, data, and control signals issued by the CPU 110 for external device 132. Address decoder 210 is coupled to cache control logic 216 on line 220. Cache control logic 216 comprises circuitry for generating cache control signals on line 142 to CPU 110. It will be apparent to those of ordinary skill in the art that the partitioning of components illustrated in FIG. 2 is a logical partitioning. The functionality described below for cache control logic 216 may alternatively be incorporated into address decoder 210 or the functionality described below for address decoder 210 may alternatively be incorporated into cache control logic 216. The decoder is coupled to a buffer 217 by line 218. The buffer 217 stores the addresses and control signals received from the CPU 110. The cache control logic 216 can generate signals on bus 219 that latch the contents of the buffer 218 onto the bus 114 so that the addresses, control signals etc., can be received by the bus controller 116. The buffer 218 maintains and prevents the CPU commands from being sent to the external device 132 until the module has performed other necessary steps.

Address decoder 210 interprets address, data and control signals using external device address table 214 and cacheability map 212. External device address table 214 is coupled to address decoder by line 224. Cacheability map 212 is coupled to address decoder 210 by line 226 and cache control logic 216 by line 222. External device address table 214 comprises a list of addresses corresponding to control/mode and status registers of external device 132.

A detailed list of the control/mode and status registers of the DMA controller used in the preferred embodiment of the present invention is illustrated in FIG. 3. It will be apparent to those of ordinary skill in the art that other implementations of external device 132 may use a different set of control/mode and status registers. In general, these control/mode and status registers are used by the CPU 110 to program external device 132 for an access to main memory 126. The CPU 110 accesses these control/mode and status registers of external device 132 by presenting an address of a desired register on line 114. The address thus presented is received by address decoder 210. By comparing the address received by address decoder 210 with the contents of external device address table 214, address decoder 210 may determine if an address presented on line 114 is an access to a control/mode or status register of an external device 132. In this manner, address decoder 210 determines when the CPU 110 is programming an external device 132 for an access to main memory 126.

A list of additional I/O addresses, memory addresses and interrupts is also provided in FIG. 4. The additional addresses are dedicated to predetermined slots in the system such as a hard disk drive, etc. These addresses will be referred to as non-standard. The CPU 110 will typically not know whether a non-standard address will modify or read the contents of main memory. To ensure cache coherency, the control module 140 treats all writes into a non-standard address as a request for an external device to read the contents of the main memory, and a read of the non-standard addresses as a completion of a data transfer. Additionally, any non-standard interrupts may be treated as the completion of a data transfer. The cacheability map 212 stores the addresses of the system and is used to determine whether an address is non-standard.

As illustrated in FIG. 3, the external device 132 of the preferred embodiment may support up to eight different channels of memory accesses to main memory 126. Any one of these channels may be independently programmed by CPU 110. Because addresses for control/mode and status registers associated with each individual channel are maintained within external device address table 214, address decoder 210 can determine on a channel by channel basis when a particular channel of an external device 132 is being programmed by the CPU 110. In addition, address decoder 210 can monitor the address presented on line 114 to determine if CPU 110 is requesting status from a status register of a particular channel of external device 132. By knowing when the CPU 110 is requesting status from an external device 132, address decoder 210 can read the status returned by external device 132 through the bus 114. In this manner, address decoder 210 can determine whether a data transfer previously initiated for a particular channel has been completed as defined by the status returned by external device 132.

Referring to FIG. 3, an address of 0000h (hex) presented on lines 114 corresponds to the memory address register of DMA channel 0. Address 0001h corresponds to the transfer count register of DMA channel 0. The memory address register and the transfer count register are control registers for DMA channel 0 in the preferred embodiment of the present invention. If CPU 110 addresses either of these control registers, address decoder 210 interprets this access as an attempt by CPU 110 to program channel 0 for a memory access to main memory 126. Address 0008h corresponds to the mode register for DMA channels 0–3. The mode register can be considered an additional control register for channels 0–3. If the mode register is addressed and a write mode for a particular channel is enabled, address decoder 210 interprets such a control register manipulation as the programming of a particular external device 132 channel for a write memory access to main memory 126. Likewise, if the mode register is addressed and a read mode for a particular channel is enabled, address decoder 210 interprets such a control register manipulation as the programming of a particular external device 132 channel for a read memory access to main memory 126.

Again referring to FIG. 3, address 0008h corresponds to the status register for DMA channels 0–3 in the preferred embodiment. When the CPU 110 addresses a status register of external device 132, address decoder 210 may subsequently read the returned status on the data lines as described above. In this manner, address decoder 210 can determine when a previously initiated memory access operation is complete.

Figures 4A, 5:
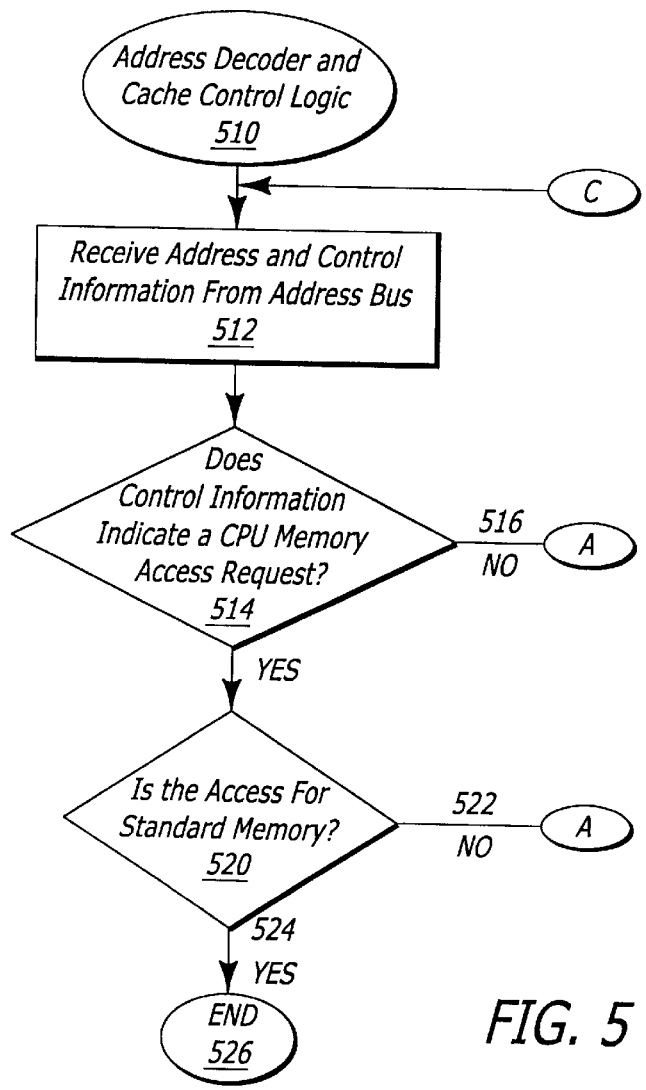
FIG. 4a illustrates the offset addresses of a battery back-up memory chip.
FIGS. 5–8 are flow diagrams illustrating the logic implemented in the cache control logic.

In the preferred embodiment, the cacheability map 212 includes a look-up table for the address registers listed in FIG. 4. The addresses can be divided into two sets, standard, and non-standard. All requests for non-standard I/O, memory and interrupts may create a cache incoherency and the external device treats these request in a manner shown in FIGS. 5–8.

The treatment of non-standard memory request depends on whether the system is 386 based or i486 based. In 386 based systems, physical memory is partitioned into conventional or base memory, and extended or top of memory. Conventional memory typically ranges from 0–256K, 0–512K, 0–640K, etc. The range of the top of memory is between 1–4 Mbytes, or whatever is the top range of memory for the system. Both the conventional memory and the extended memory are cacheable. The memory between the conventional memory and the extended memory typically contains programs such as BIOS, VGA windows, etc. The cacheability map sets the memory between the conventional memory and the extended memory as cacheable and the interim memory as non-cacheable. When the processor request non-standard memory, the module 140 controls the cache so that the non-standard memory is not stored in cache. i486 based systems have built-in compensation for cacheability and therefore do not have to utilize the module 140 to determine whether a memory access is cacheable.

at In PC AT systems, the system configuration details are stored in a battery back-up memory and accessible thorough I/O ports 0070h and 0071h. During the boot sequence of the system, the external device snoops the accesses to I/O ports 0070h and 0071h and stores the memory size information in the cacheability map. With this scheme the external device contains a memory map consistent with the memory size configuration of the system. FIG. 4a shows the offsets in the memory store memory size information.

When the module 140 determines that the external device 132 is being programmed for a modification of main memory 126, the module 140 then sends the CPU command (addresses and control signals) to the external device. After the data transfer between the external device and main memory has been completed, the cache addresses associated with the modified space of main memory is written into the main memory and the cache is flushed.

If the module is in a system that supports writethrough cache (i486 based system) the bus controller 116 provides the CPU 110 with the addresses of the main memory that are to be modified during the write cycle. The CPU 110 compares the addresses being modified with the address within cache 112. The CPU 110 then invalidates all data within cache 112 that corresponds to the addresses of main memory 126 being modified by the external device 132. Therefore, in a i486 based system, instead of flushing the entire cache 112, only the cache lines corresponding to the modified addresses of main memory 126 are invalidated.

If the module determines that the external device 132 is programmed to read the contents of the main memory 126, the module 140 again stores the CPU command in the buffer 217 and generates cache control signals that are relayed to cache 112 to initiate a write of data from cache 112 to the main memory 126. The control module 140 then sends the CPU commands to the external device.

Referring now to FIG. 5, a portion of the logic of the module implemented within address decoder 210 and cache control logic 216 is illustrated. This logic may be implemented as a gate array, custom integrated hardware or microcode embodiment. It will be apparent to one of ordinary skill in the art that the below-described logic may be implemented using conventional techniques. The address decoder 210 receives an address and control information for a bus cycle via bus 114 from the CPU 110 (processing block 512). If the control information indicates that the address thus presented corresponds to a request by the CPU 110 to access main memory 126, processing path 518 is taken to decision block 520. If, however, the bus cycle is not a CPU memory access request, processing path 516 is taken to the bubble labeled A as illustrated in FIG. 6.

In decision block 520, the external device determines whether the memory access is for standard or non-standard memory. If the access is for non-standard memory, processing path 522 continues to bubble A. If the access is for standard memory, processing path 524 terminates at bubble 526.

Figure 6:
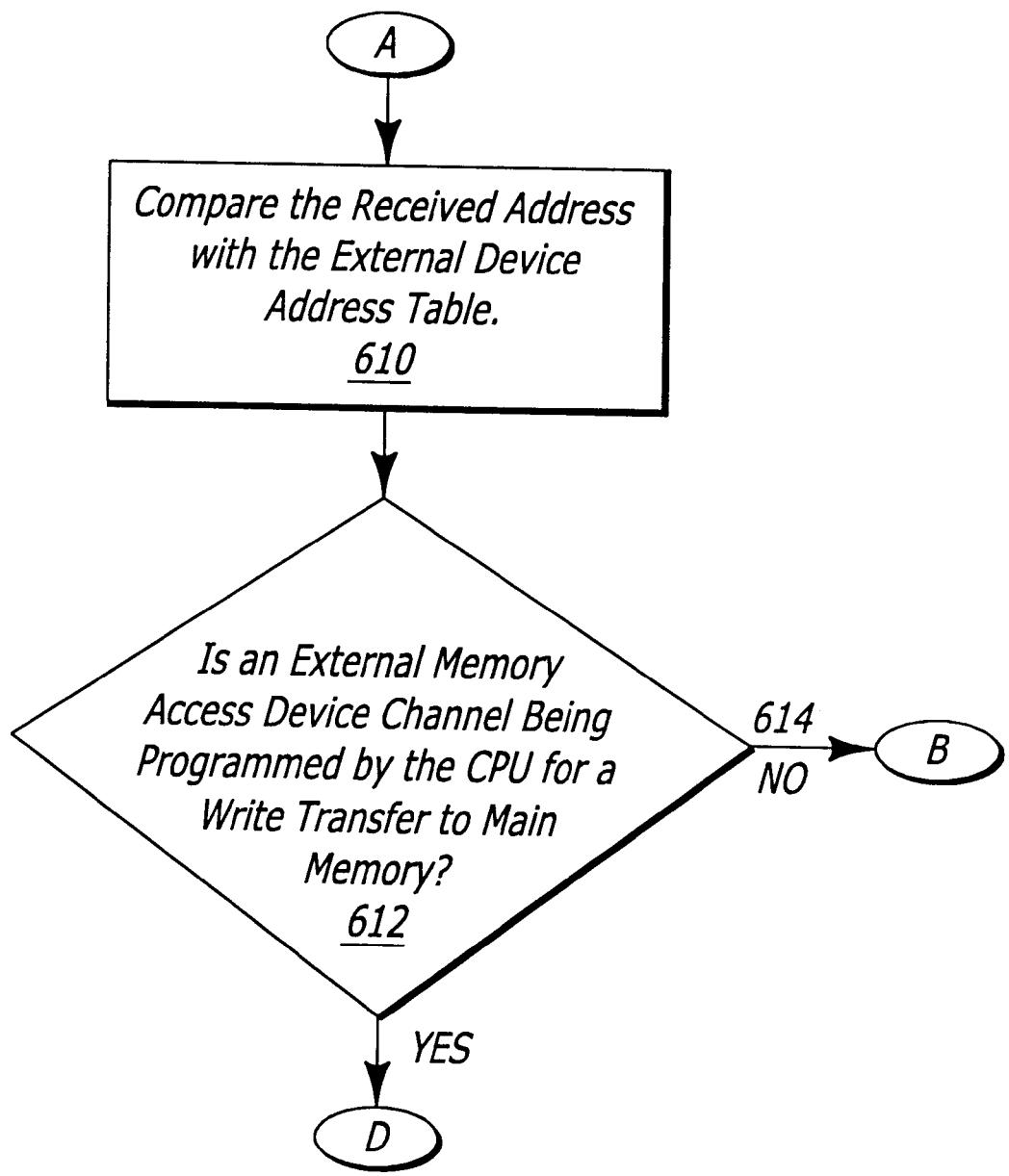

Referring now to FIG. 6, processing for the control logic within address decoder 210 and cache control logic 216 is illustrated starting at the bubble labeled A. Processing block 610 is performed for bus cycles that are not CPU requests for access to main memory 126. Because such an access might lead to an operation of a device causing cache incoherency, address decoder 210 compares the received address with the contents of external device address table 214 (processing block 610). Using this table, cache control logic 216 can determine if the received address corresponds to the address of a control/mode or status register of external device 132. If a control and mode register of external device 132 is accessed as defined in external device address table 214, address decoder 210 interprets this access as an attempt by CPU 110 to program the external device 132 for a memory access to main memory 126.

If a channel of external device 132 is being programmed by CPU 110 for a write transfer to main memory 126, processing path 616 is taken to bubble D. If, however, external device 132 is being programmed for access to read main memory, processing path 614 is taken to bubble B.

Figure 7:
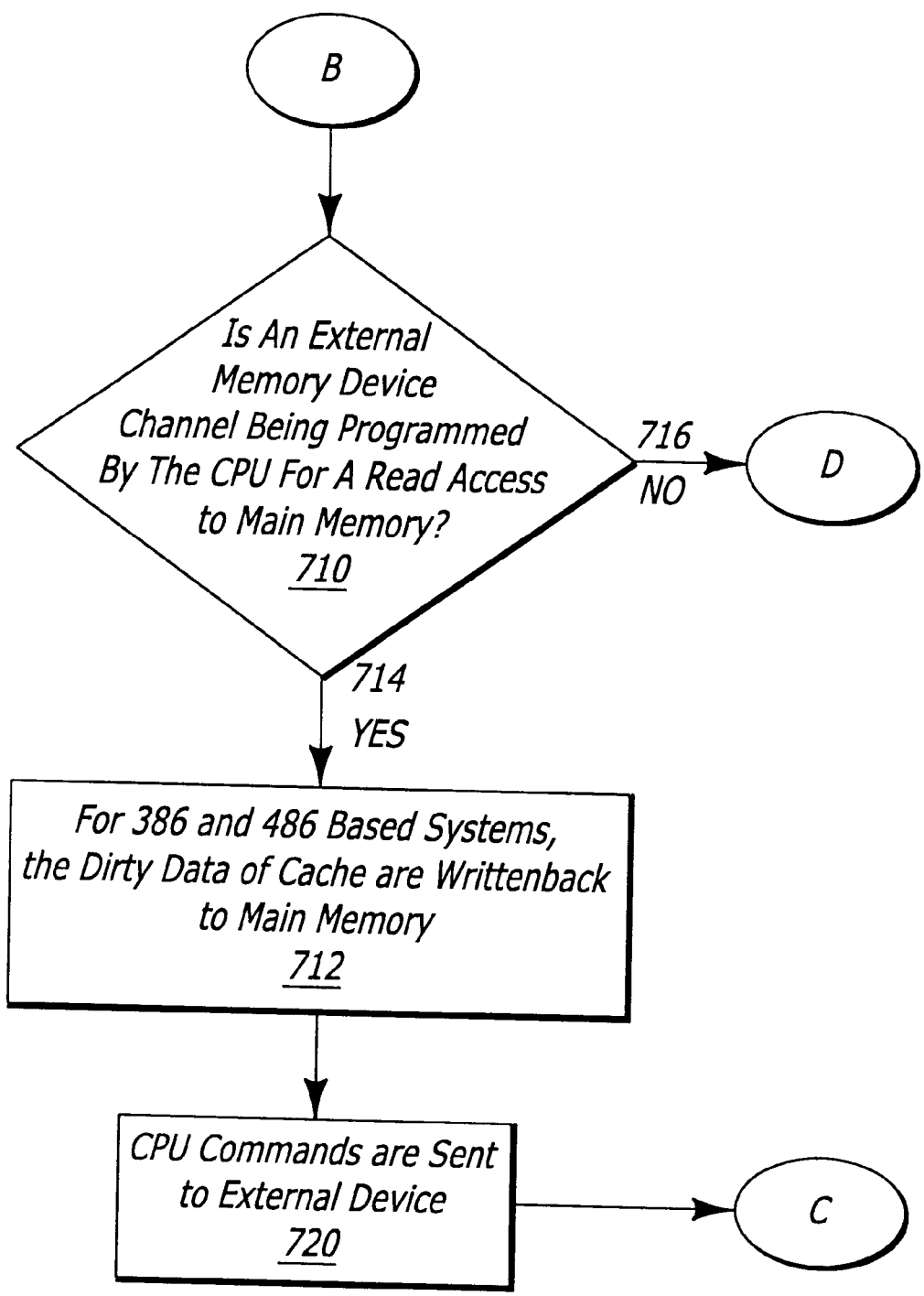

Referring now to FIG. 7, the address decoder 210 determines if the CPU 110 has programmed a particular channel of external device 132 to read the main memory 126 in processing block 710. If the decoder determines that the CPU 100 is commanding an external device read memory access, the logic proceeds to process block 712 through line 714. If the CPU 100 is not commanding a read memory access processing continues along line 716 to bubble D. In processing block 712 the control logic 216 initiates a writeback of the cache lines that contain dirty data. The CPU commands are then sent to the external device in processing block 720.

Figure 8:
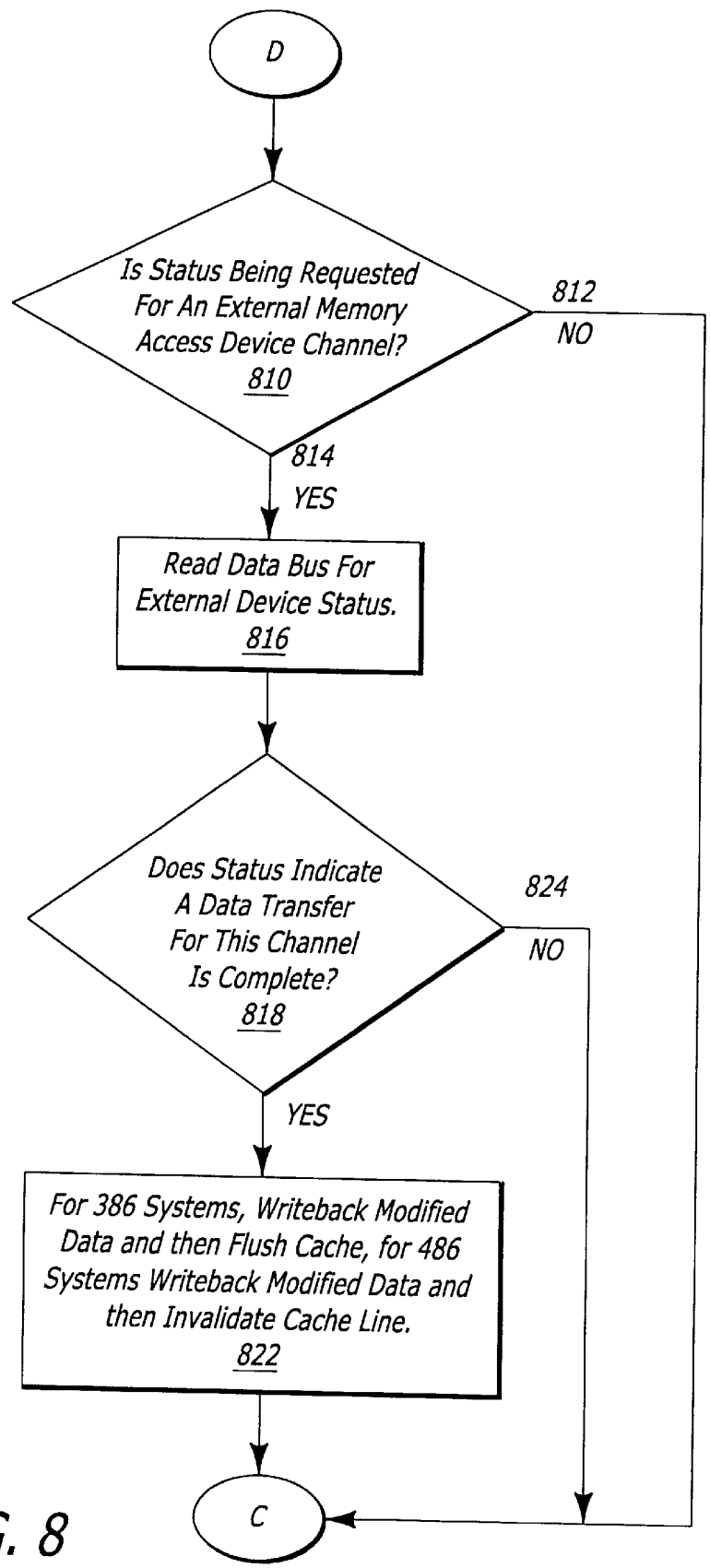

Referring now to FIG. 8, processing performed by address decoder 210 and cache control logic 216 continues at the bubble labeled D. Decision block 810 is performed when a particular bus cycle is neither a CPU memory access request nor an attempt by CPU 110 to program a control or mode register of external device 132. In this case, CPU 110 may be issuing an address of a status register of external device 132 for the purpose of requesting the status of a particular channel of external device 132. Address decoder 210 determines if a status register of external device 132 is being addressed by comparing the received address with the contents of external device address table 214. If the received address corresponds to a status register for a particular channel of external device 132, processing path 814 is taken to processing block 816 illustrated in FIG. 8. These data signals will correspond to the contents of the status register addressed by the received address. The contents of the status thus received may be interpreted to determine if a memory access request previously initiated for the corresponding channel has been completed.

After completion of a data transfer, the data within the cache associated with the main memory space which has been modified is transferred from cache to main memory in processing block 822. For 386 based system, the entire cache is then flushed, for i486 based system, only the lines containing modified data are flushed. If the received address does not correspond to a status register of external device 132 as defined in external device address table 214, processing path 812 is taken to bubble C. Additionally, if there is a data transfer, but the data transfer is not complete, processing continues on path 824 to bubble C.

Thus in this manner cache incoherency is prevented while an external device is accessing a portion of main memory. It should be noted that the implementation of the present invention does not require the addition or modification of signals existing on the bus. Thus the present invention may be used in computer systems which contain buses that do not support caching (i.e., buses that do not include signals specifically used for maintaining cache coherency) or support only writethrough cache. Thus, computer systems not having a cache supporting bus may nevertheless benefit by use of a cache supporting CPU. With the aid of the present invention, these computer systems may still maintain cache coherency without a significant modification to the system architecture.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A cache coherency apparatus for a computer system that has a main memory and a memory access device connected to a bus, and a central processing unit (CPU) that is coupled to a cache memory, comprising:

a monitoring circuit that decodes addresses and control signals sent from the CPU and determines when the CPU is commanding the memory access device to access the main memory; and, a cache control circuit coupled to said monitoring circuit, said cache control circuit sends the addresses and control signals to the memory access device so that memory access device can modify the main memory, said cache control circuit then modifies the main memory with the contents of the cache memory after the memory access device has modified the main memory.

2. The cache coherency apparatus as recited in claim 1, wherein said cache control circuit generates a cache memory flush control signal if the CPU command will enable the memory access device to modify the contents of the main memory.

3. The cache coherency apparatus as recited in claim 1, wherein the CPU will selectively invalidate memory locations of the cache memory that correlate to memory locations of the main memory that are to be modified by the memory access device.

4. The cache coherency apparatus as recited in claim 1, wherein said cache control circuit sets control pins of the cache memory so that the contents of the main memory are modified when the CPU modifies the contents of the cache memory, before the memory access device has accessed the contents of the main memory.

5. The cache coherency apparatus as recited in claim 1, further comprising a cacheability map coupled to said cache control circuit for storing cacheability information indicating whether areas of the main memory are cacheable or not cacheable.

6. The cache coherency apparatus as recited in claim 5, wherein said monitoring circuit determines if the memory access device has completed a modification of the contents of the main memory by monitoring addresses of status registers of the memory access device and by reading the status of the memory access device after one of said status registers is addressed.

7. A computer system, comprising:

a bus for communicating data and control signals;

a main memory coupled to said bus;

a memory access device coupled to said bus;

a central processing unit (CPU);

a cache memory coupled to said CPU;

a cache coherency apparatus coupled to said CPU and said bus, said cache coherency apparatus including;

a monitoring circuit that decodes addresses and control signals sent from said CPU and determines when said CPU is commanding said memory access device to access said main memory; and, a cache control circuit coupled to said monitoring circuit, said cache control circuit sends the addresses and control signals to said memory access device so that the memory access device can modify said main memory, said cache control circuit then modifies the main memory with the contents of the cache memory after the memory access device has modified the main memory.

8. The computer system as recited in claim 7, wherein said cache control circuit generates a cache memory flush control signal if the CPU command will enable said memory access device to modify the contents of said main memory.

9. The computer system as recited in claim 8, wherein the CPU will selectively invalidate memory locations of said cache memory that correlate to memory locations of said main memory that are to be modified by said memory access device.

10. The computer system as recited in claim 9, wherein said cache control circuit sets control pins of said cache memory so that the contents of said main memory are modified when said CPU modifies the contents of said cache memory, before said memory access device has accessed the contents of said main memory.

11. The computer system as recited in claim 7, further comprising a cacheability map coupled to said cache control circuit for storing cacheability information indicating whether areas of said main memory are cacheable or not cacheable.

12. The computer system as recited in claim 11, wherein said monitoring circuit determines if said memory access device has completed a modification of the contents of said main memory by monitoring addresses of status registers of said memory access device and by reading the status of said memory access device after one of said status registers is addressed.

13. A cache coherency apparatus for a computer system that has a main memory and a memory access device connected by a bus, and a central processing unit (CPU) that is coupled to a cache memory, comprising:

monitoring circuit means for decoding addresses and control signals sent from the CPU and determining when the CPU is commanding that the memory access device access the main memory; and, cache control circuit means coupled to said monitoring circuit means for sending the addresses and control signals to the memory access device for modification of the main memory and for modifying the main memory with the contents of the cache memory after the memory access device has modified the main memory.

14. The cache coherency apparatus as recited in claim 13, further comprising a cacheability map coupled to said cache control circuit for storing cacheability information indicating whether areas of the main memory are cacheable or not cacheable.

15. The cache coherency apparatus as recited in claim 14, wherein said monitoring circuit means determines if the memory access device has completed a modification of the contents of the main memory by monitoring addresses of status registers of the memory access device and by reading the status of the memory access device after one of said status registers is addressed.

16. The cache coherency apparatus as recited in claim 13, wherein said cache control circuit means generates a cache memory flush control signal if the CPU command will enable the memory access device to modify the contents of the main memory.

17. The cache coherency apparatus as recited in claim 16, wherein the CPU will selectively invalidate memory locations of the cache memory that correlate to memory locations of the main memory that are to be modified by the memory access device.

18. The cache coherency apparatus as recited in claim 17, wherein said cache control circuit means sets control pins of the cache memory so that the contents of the main memory are modified when the CPU modifies the contents of the cache memory, before the memory access device has accessed the contents of the main memory.

19. The cache coherency apparatus as recited in claim 18, wherein said cache control circuit means stores a cache enable indication in a cacheability map if the memory access device has completed a modification of the contents of the main memory.

20. A method for maintaining coherency between a cache memory coupled to a central processing unit (CPU) and a main memory coupled to a memory access device, comprising the steps of:

a) modifying the contents of the cache memory with data from the CPU;

b) generating a CPU command which will enable the memory access device to modify the contents of the main memory;

c) sending the CPU command to the memory access device;

d) modifying the contents of main memory with data from the memory access device; and, e) modifying the contents of the main memory with the contents of the cache memory.

21. The method as recited in claims 20, wherein the cache memory is flushed after the contents of the main memory are modified with the contents of the cache memory.

22. The method as recited in claim 20, wherein a dirty cache indication signal is generated for each line of the cache memory which contains modified data, and the main memory is only modified with the lines of cache that have a corresponding dirty cache indication signal.

* * * * *

UNITED STATES PATENT AND TRADEMARK OFFICE
CERTIFICATE OF CORRECTION

PATENT NO.     : 5,950,227
DATED          : September 7, 1999
INVENTOR(S)    : Kulkarni It is certified that error appears in the above-identified patent and that said Letters Patent is hereby corrected as shown below:

Title page,
Item [54], Title, delete "AFTER", insert -- BEFORE --.

Column 7,
Line 8, delete "0008h", insert -- 000Bh --.
Line 56, before "In PC AT", delete "at".

Signed and Sealed this

Fourteenth Day of October, 2003

JAMES E. ROGAN
*Director of the United States Patent and Trademark Office*